Patented Apr. 25, 1933

1,905,833

UNITED STATES PATENT OFFICE

CHESTER C. FEAGLEY, OF PHILADELPHIA, PENNSYLVANIA, ASSIGNOR, BY MESNE ASSIGNMENTS, TO THE GRASSELLI CHEMICAL COMPANY, A CORPORATION OF DELAWARE

NONHYGROSCOPIC COMPOSITION COMPRISING ALUMINUM SULPHATE AND AN ACID SALT

No Drawing.  Application filed June 25, 1926. Serial No. 118,568.

This invention relates to a non-hygroscopic acid sulphate of aluminum or acid alum, and also to a process of producing the same, or a composition containing the same.

The production of suitable acid sulphate of aluminum or acid alum has hitherto been impracticable because of its hygroscopic character and the difficulty in grinding it. The attempted avoidance of this difficulty by incorporating in the material a proportion of insoluble matter has been open to the objection that the final product is not suitable for all purposes, and, of course, contains insoluble matter that requires separation if a clear solution is to be obtained.

The invention has accordingly as an object the production of a suitable acid sulphate of aluminum or acid alum, or a composition containing the same, that would be non-hygroscopic. The invention has also as an object the production of such a material in a soluble form, that is, without the addition of insoluble matter. A further object is to treat a hygroscopic particle of the material entering into the composition in such a manner as to render it non-hygroscopic. These and other objects are accomplished in the following description of the invention.

As an embodiment of the invention the following example will be described. Commercial sulphate of aluminum in ground form is mixed with ground niter cake containing 30% sulphuric acid, the respective parts being 80 for the sulphate of aluminum and 20 for the niter cake. The mixture will then contain about 6% of free sulphuric acid. Since the niter cake is itself hygroscopic I have found a method of overcoming this difficulty, which method consists in mixing with the niter cake particles a small amount of sodium carbonate so that a reaction takes place on the surfaces of the particles causing the formation of neutral sodium sulphate on the exterior surfaces of the particles. Since the neutral sodium sulphate is non-hygroscopic, the entire mass of niter cake will thus be rendered non-hygroscopic also. In this manner a composition containing aluminum sulphate is prepared in soluble and non-hygroscopic condition.

A modification of this particular procedure may be carried out by forming a film or coating of neutral or non-hygroscopic sodium sulphate on the exterior surfaces of the niter cake particles by the action of heat or hot gases or in any other suitable manner. The niter cake thus prepared can be mixed with the alum in the manner above described. Or the substances can be mixed and then subjected to heat treatment or an alkali treatment as above described.

If it is desired to omit the niter cake or acid sodium sulphate, the preparation of acid alum or acid sulphate of aluminum can be sprayed in the form of a solution in a chamber through which hot gases are passed to dry the sprayed particles before they fall to the bottom, such drying being conducted at a temperature sufficiently high to decompose or dry the exterior surfaces of the particles to form a basic sulphate of aluminum and thus render the particles non-hygroscopic. The same idea may be applied to a composition containing acid alum or acid sulphate of aluminum by spraying the material into a region where the temperature is sufficient to effect the desired decomposition on the exterior surfaces. Likewise a neutral alum or sulphate of aluminum mixed with an acid substance or niter cake may be similarly sprayed and the exterior surfaces dried and decomposed in the above described manner. Various other applications of this idea will occur in view of the foregoing description.

It will therefore be apparent that by the foregoing description and embodiments the purposes and objects of this invention can be accomplished in such a manner as to render the resulting products fit for various uses in which acid alums and acid aluminum sulphates, or compositions containing them, may be successfully employed.

As many apparently widely different embodiments of this invention may be made without departing from the spirit thereof, it is to be understood that the invention is not to be limited to the foregoing description and embodiments except as indicated in the appended claim.

I claim:

The process of forming a soluble non-hygroscopic acid sulphate of aluminum which comprises adding sodium carbonate to particles of sodium acid sulphate to form thereon a coating of normal sodium sulphate to render them non-hygroscopic and thereafter incorporating said particles with aluminum sulphate.

In testimony whereof I affix my signature.

CHESTER C. FEAGLEY.